US010395163B2

(12) United States Patent
Fu

(10) Patent No.: US 10,395,163 B2
(45) Date of Patent: Aug. 27, 2019

(54) METAL CHIP CARD CAPABLE OF SUPPORTING RADIO FREQUENCY COMMUNICATION AND PAYMENT

(71) Applicant: Hightec Technology Co., Ltd, Shenzhen, Shenzhen, Guangdong (CN)

(72) Inventor: Zhili Fu, Guangdong (CN)

(73) Assignee: Hightec Technology Co., Ltd, Shenzhen, Shenzhen (CN)

( * ) Notice: Subject to any disclaimer, the term of this patent is extended or adjusted under 35 U.S.C. 154(b) by 0 days.

(21) Appl. No.: 16/092,764

(22) PCT Filed: Apr. 11, 2017

(86) PCT No.: PCT/CN2017/080135
§ 371 (c)(1),
(2) Date: Oct. 11, 2018

(87) PCT Pub. No.: WO2017/177906
PCT Pub. Date: Oct. 19, 2017

(65) Prior Publication Data
US 2019/0130242 A1    May 2, 2019

(30) Foreign Application Priority Data
Apr. 11, 2016  (CN) .................... 2016 2 0289896 U

(51) Int. Cl.
*G06K 7/08*     (2006.01)
*G06K 19/06*    (2006.01)
(Continued)

(52) U.S. Cl.
CPC ..... *G06K 19/07788* (2013.01); *G06K 19/077* (2013.01); *G06K 19/0723* (2013.01)

(58) Field of Classification Search
USPC ................................ 235/380, 451, 488, 492
See application file for complete search history.

(56) References Cited

U.S. PATENT DOCUMENTS

| 8,567,679 B1* | 10/2013 | Mullen | G06K 19/077 |
| | | | 235/457 |
| 2003/0073327 A1* | 4/2003 | Gundlach | G06K 7/0095 |
| | | | 439/64 |

(Continued)

FOREIGN PATENT DOCUMENTS

| CN | 102089772 A | 6/2011 |
| CN | 103907125 A | 7/2014 |

OTHER PUBLICATIONS

International Search Report of PCT Patent Application No. PCT/CN2017/080135 dated Jul. 19, 2017.

*Primary Examiner* — Tuyen K Vo

(57) ABSTRACT

A metal chip card capable of supporting radio frequency communication and payment. An antenna circuit module of the metal chip card consists of an FPC/PCBA antenna circuit board (11), an IC chip (12), a chip sealing adhesive (13), and a two-side gold-plated touch electrode (26). An ultrathin ferrite wave absorption electromagnetic shielding layer (27) is stuck below the antenna circuit module, and the antenna circuit module and a substrate (28) which is provided with a milled groove and the inner wall of which is coated with a hot melt adhesive layer (14) are packaged into a metal chip card by means of hot pressing. The metal chip card can implement RFID and NFC radio frequency functions on a metal card body and can be normally used without barriers.

5 Claims, 1 Drawing Sheet

(51) Int. Cl.
*G06K 19/077* (2006.01)
*G06K 19/07* (2006.01)

(56) References Cited

U.S. PATENT DOCUMENTS

2013/0255848 A1\* 10/2013 Cox ................. G06K 19/07722
  156/60
2016/0307189 A1\* 10/2016 Zarakas ............... G06Q 20/352

\* cited by examiner

METAL CHIP CARD CAPABLE OF SUPPORTING RADIO FREQUENCY COMMUNICATION AND PAYMENT

CROSS REFERENCE

The present disclosure is based on, and claims the priority of, Chinese application No. CN201620289896.4 filed on Apr. 11, 2016, the disclosure of which is incorporated herein by reference in its entirety.

TECHNICAL FIELD

The present disclosure relates to manufacture of metal smart card such as metal bank card, membership card, commemorative card or the like, and solves the radio frequency interference problem of metal to antenna for RFID (i.e. radio frequency identification) and NFC (i.e. near field communication) and enables the RFID and NFC radio frequency functions to be normally used in the metal card without any obstacle.

BACKGROUND

Chip card is a collective name for IC card and ID card, and generally may also be referred to as smart card, which is already one of the hot products of the international electronic information industry. The application of the chip card is no longer limited to early communication field, but widely extended to various fields such as financial finance, social insurance, transportation and tourism, medical and health, government administration, retail of goods, leisure and entertainment, school management, etc.

Dual interface chip card and non-contact chip card are also referred to as radio frequency card. The radio frequency card includes an IC chip and an inductive antenna, which are packaged in a standard PVC plastic card without any exposed chip and antenna parts. The radio frequency card successfully combines radio frequency identification technology with IC technology and solves the problems of passive and contactless. The card may close the surface of a card reader in 5-10 mm and complete the read and write operations of data by radio waves.

FIG. 1 schematically shows a longitudinal section exploded view of a PVC chip card package structure currently on the market. An IC chip 12 is mounted on a lower surface of a printed antenna circuit board 11. A sealing adhesive 13 fixes and protects the chip and gold wire solder joints. A groove is milled on an upper surface of the card 15 made of PVC plastic substrate. A hot melt adhesive layer 14 is coated on an inner wall of the groove. The antenna circuit board module is pressed into the groove of the PVC card body to be packaged into a PVC chip card.

The existing PVC chip card and its packaging technical solutions have the following disadvantages:

1. the chip card made of PVC plastic material has worse weather resistance, reliability, card body life (i.e. durability) than metal card;
2. from the appearance and decoration, the metal chip card is more noble, and should be high-end, differentiated and lean product in smart cards;
3. if the packaging solutions for PVC chip card are used in metal card body, due to the natural interference of the metal card body itself to the radio frequency antenna, the corresponding antenna circuit can not generate correct radio frequency signal, and therefore corresponding radio frequency functions can not be implemented; and
4. due to the influence of the distributed capacitance generated on the antenna by the metal card body, the frequency of the radio frequency signal is offset, the stability of AC signal deteriorates, and the quality of data exchanged by radio frequency will be weakened and interfered, such that the normal radio frequency signal communication and data communication with the card reader cannot be achieved.

Therefore, currently in the mature commercial market worldwide, there is still no RFID and NFC solution for full-metal cards. The existing RFID and NFC radio frequency solutions basically cannot realize normally the corresponding designed functions when used in metal chip cards.

SUMMARY

The issue which needs to be solved by the present disclosure is to provide a technical solution which can effectively block the electromagnetic field interference between metal card body and radio frequency antenna and radio frequency operating circuit such that the RFID and NFC operating circuits can be used in metal card body while corresponding radio frequency functions can be normally implemented independently without interference.

The core of the technical solution of the present disclosure is as follows. The NFC 13.56 MHz miniature antenna solution is customized based on RFID or dual interface chip and implemented as FPC or PCBA. FPC refers to high-density wiring, bending resistance and extremely thin flexible circuit boards, and PCBA refers to printed circuit board on which electronic components are mounted by SMT or inserted by DIP. A matching ultrathin ferrite wave absorption electromagnetic shielding layer with a thickness smaller than 0.3 mm is used as a middle layer on the back of the fabricated PCBA antenna. The FPC/PCBA module attached by the ferrite wave absorption electromagnetic shielding layer is stuck in the milled metal card body by adhesive.

The antenna circuit module of the metal chip capable of supporting radio frequency communication and payment of the present disclosure includes a FPC/PCBA antenna circuit board, an IC chip, a chip sealing adhesive and a two-side gold-plated touch electrode. The ultrathin ferrite wave absorption electromagnetic shielding layer is stuck on the lower surface of the antenna circuit module. The antenna circuit module and a metal substrate which is provided with a milled groove and an inner wall of which is coated with a hot melt adhesive layer are packaged into the metal chip card by means of hot pressing In the metal chip card capable of supporting communication and payment as described above, a NFC antenna with an area smaller than ¼ of an card area is embedded on an upper surface of the FPC/PCBA antenna circuit board. In the metal chip card capable of supporting communication and payment as described above, the two-side gold-plated contact touch electrode is further embedded on the upper surface of the FPC/PCBA antenna circuit board.

In the metal chip card capable of supporting communication and payment as described above, a lower surface of the FPC/PCBA antenna circuit board is stuck with the IC chip and the sealing adhesive used for fixing and protecting gold wire solder joints.

In the metal chip card capable of supporting communication and payment as described above, the lower surface of the FPC/PCBA antenna circuit board is further stuck with the ultrathin ferrite wave absorption electromagnetic shielding layer with a thickness smaller than 0.3 mm.

In the metal chip card capable of supporting communication and payment as described above, the material of the metal substrate which is provided with a milled groove and an inner wall of which is coated with a hot melt adhesive layer is copper or stainless steel or lightweight aluminum alloy or titanium alloy or gold or silver.

In the metal chip card capable of supporting communication and payment as described above, the material of the metal substrate which is provided with a milled groove and an inner wall of which is coated with a hot melt adhesive layer is copper, stainless steel, lightweight aluminum alloy, titanium alloy, gold, silver.

In the present disclosure, a full-metal card with RFID, NFC radio frequency functions is implemented, and corresponding antenna circuit can be designed based on the IC of universal radio frequency function smart card to achieve the application of corresponding function. Alternatively, it can also be designed as being used in dual interface metal chip card. Therefore, the problem that currently there is still no metal chip card product having radio frequency function in smart card universal product field is solved.

BRIEF DESCRIPTION OF THE DRAWINGS

In order to more clearly illustrate the technical solutions of the embodiments of the present disclosure, brief description of the drawings to be used in the embodiments will be made below. Apparently, the drawings described below are only some of the embodiments of the present disclosure. For those skilled in the art, other drawings can be obtained according to these drawings without paying creative labor.

DETAILED DESCRIPTION

Figure 1:
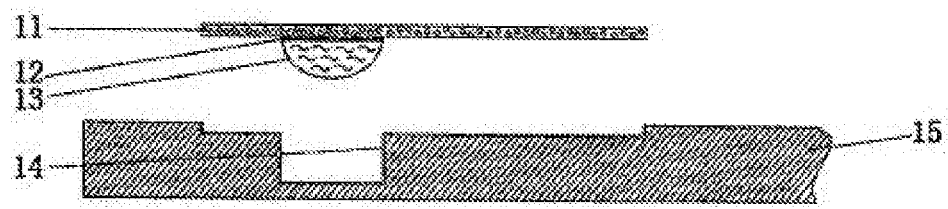
FIG. 1 is a schematic longitudinal section exploded view of a common PVC chip card package structure.

In order to facilitate understanding to the present disclosure, a more comprehensive description of the present disclosure will be made below with reference to the drawings. Preferred embodiments of the present disclosure are given in the drawings. However, the present disclosure may be implemented in various forms, but not limited to the embodiments described herein. Rather, the embodiments are provided for the purpose of making the understanding to the present disclosure to be more thorough and comprehensive.

Unless otherwise defined, all technical and scientific terms used herein have the same meaning as commonly understood by one ordinarily skilled in the art to which the present disclosure pertains. In the present disclosure, the terms used in the description is for the purpose of describing the specific embodiments, but not intended to limit the present disclosure.

Figure 2:
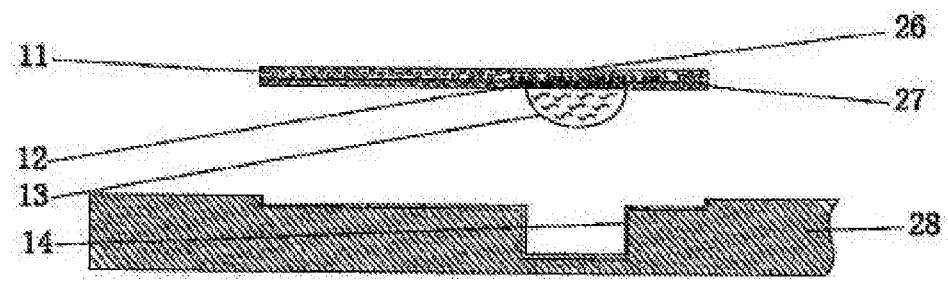
FIG. 2 is a longitudinal section exploded view of the package structure of the metal chip card capable of supporting communication and payment of the present disclosure.

FIG. 2 shows a longitudinal section exploded view of the package structure of the metal chip card capable of supporting communication and payment of the present disclosure. An antenna circuit module of the metal chip card capable of supporting radio frequency communication and payment includes a FPC/PCBA antenna circuit board 11, a IC chip 12, a chip sealing adhesive 13 and a two-side gold-plated touch electrode 26. A lower surface of the antenna circuit module is stuck with an ultrathin ferrite wave absorption electromagnetic shielding layer 27. The antenna circuit module and a metal substrate 28 which is provided with a milled groove and an inner wall of which is coated with a hot melt adhesive layer 14 are packaged into a metal chip card by means of hot pressing.

A NFC antenna with an area smaller than ¼ of the card area is embedded on an upper surface of the FPC/PCBA antenna circuit board 11. The two-side gold-plated contact touch electrode is further embedded on the upper surface of the FPC/PCBA antenna circuit board 11.

A lower surface of the FPC/PCBA antenna circuit board 11 is stuck with the IC chip 12 and the sealing adhesive used for fixing and protecting gold wire solder joints. The lower surface of the FPC/PCBA antenna circuit board 11 is further stuck with the ultrathin ferrite wave absorption electromagnetic shielding layer with a thickness smaller than 0.3 mm.

The material of the metal substrate 28 which is provided with a milled groove and an inner wall of which is coated with a hot melt adhesive layer 14 is copper or stainless steel or lightweight aluminum alloy or titanium alloy or gold or silver.

Figure 3:
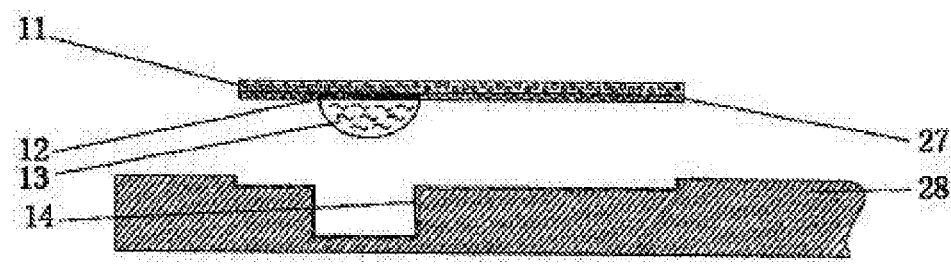
FIG. 3 is a schematic longitudinal section exploded view of the package structure of the metal radio frequency card of an embodiment of the present disclosure.

An example of the embodiments of the metal chip card capable of supporting communication and payment of the present disclosure is non-contact metal chip card, which may also be referred to as metal radio frequency card, and a schematic longitudinal section exploded view of the package structure of which is shown in FIG. 3. The IC chip 12 for RFID function is selected according to the application function of the radio frequency card. The model number of the IC chip 12 is NXP MifareS50. A matched small size antenna is correspondingly designed, and made as the FPC/PCBA antenna circuit 11. The chip is packaged on the lower surface of the FPC/PCBA and fixed and sealed as 13. The ultrathin ferrite wave absorption electromagnetic shielding layer 27 is mounted on the lower surface of the antenna circuit FPC/PCBA on which the chip is packaged. The ultrathin ferrite wave absorption electromagnetic shielding layer 27 has a thickness smaller than 0.2 mm, a magnetic conductivity larger than FerriteW $\mu'=50$ and a magnetic loss $\mu''=1$. The antenna circuit board module mounted by the ultrathin ferrite wave absorption electromagnetic shielding layer is mounted in the pre-milled groove in the metal card. The metal is TC4 titanium alloy. The hot melt adhesive layer 14 is coated on the inner wall of the metal groove so as to connect the sealing adhesive 13 of the chip and the metal groove body 28. After being packaged into a metal chip card, it can be read and tested. The model of the data read/write card and device is HID OMINIKEY 5321, and the frequency and quality factor test equipment is Smartware US-CLT analysis card reader. The test results are as follows:

(1) test frequency is 14 MHz-16 MHz, and Q value is 8-15;

(2) the card is readable on one side, and the effective card reading distance is greater than 1 cm;

(3) personalized data can be effectively written and read; and (4) the test results show that the metal chip card can realize the NFC radio frequency function for communication and payment.

The embodiments above are preferred embodiments of the present disclosure. However, the present disclosure will not be limited by the embodiments above. Any other changes, modifications, substitutions, combinations and simplifications made without departing from the spirit and principles of the present disclosure should be equivalent replacements and included in the scope of protection of the present disclosure.

The invention claimed is:

1. A metal chip card supporting radio frequency communication and payment, wherein, an antenna circuit module of the metal chip card supporting radio frequency communication and payment comprises a flexible printed circuit/printed circuit board assembly (FPC/PCBA) antenna circuit board, an IC chip, a chip sealing adhesive and a two-side gold-plated touch electrode, an ultrathin ferrite wave absorption electromagnetic shielding layer is stuck below the antenna circuit module, the two-side gold-plated touch electrode is disposed on a surface of the FPC/PCBA antenna circuit board, and the antenna circuit module and a metal substrate which is provided with a milled groove and an inner wall of which is coated with a hot melt adhesive layer are packaged into the metal chip card by means of hot pressing, wherein a lower surface of the FPC/PCBA antenna circuit board is stuck with the IC chip and the sealing adhesive used for fixing and protecting gold wire solder joints.

2. The metal chip card supporting radio frequency communication and payment of claim 1, wherein a NFC antenna with an area smaller than ¼ of a card area is embedded on an upper surface of the FPC/PCBA antenna circuit board.

3. The metal chip card supporting radio frequency communication and payment of claim 1, wherein the two-side gold-plated contact touch electrode is further embedded on an upper surface of the FPC/PCBA antenna circuit board.

4. The metal chip card supporting radio frequency communication and payment of claim 1, wherein a lower surface of the FPC/PCBA antenna circuit board is further stuck with the ultrathin ferrite wave absorption electromagnetic shielding layer with a thickness smaller than 0.3 mm.

5. The metal chip card supporting radio frequency communication and payment of claim 1, wherein a material of the metal substrate which is provided with a milled groove and an inner wall of which is coated with a hot melt adhesive layer is copper or stainless steel or lightweight aluminum alloy or titanium alloy or gold or silver.

* * * * *